May 8, 1923.

J. LITTLEFIELD 1,454,751

DOWELING MACHINE

Filed Dec. 5, 1921

John Littlefield.
INVENTOR

BY Victor J. Evans
ATTORNEY

WITNESS: Fred W. Ely

May 8, 1923.
J. LITTLEFIELD
DOWELING MACHINE
Filed Dec. 5, 1921
1,454,751
2 Sheets-Sheet 2
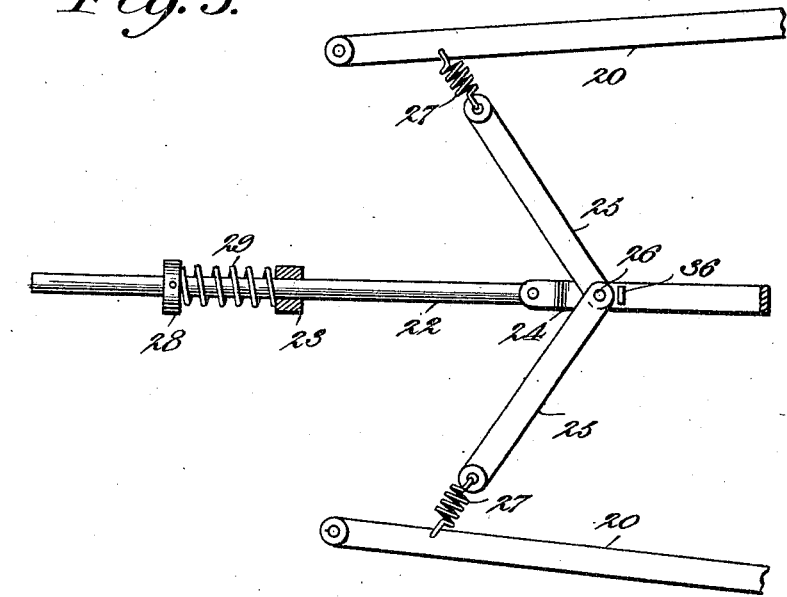
Fig. 5.
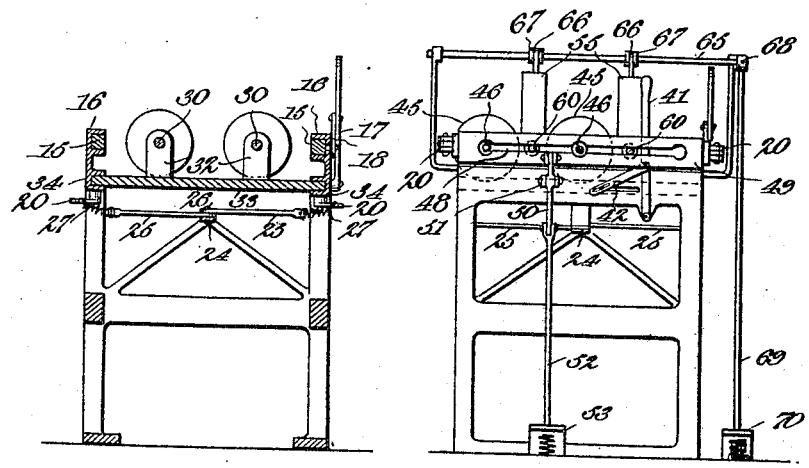
Fig. 3.
Fig. 4.
John Littlefield.
INVENTOR
WITNESS: Fred W. Ely.
BY Victor J. Evans
ATTORNEY Patented May 8, 1923.

1,454,751

UNITED STATES PATENT OFFICE.

JOHN LITTLEFIELD, OF BAYONNE, NEW JERSEY.

DOWELING MACHINE.

Application filed December 5, 1921. Serial No. 520,138.

*To all whom it may concern:*

Be it known that I, JOHN LITTLEFIELD, a citizen of the United States, residing at Bayonne, in the county of Hudson and State of New Jersey, have invented new and useful Improvements in Doweling Machines, of which the following is a specification.

This invention relates to doweling machines.

Some of the objects of the present invention are: to produce a comparatively thoroughly efficient and effectual machine of the character mentioned; to combine in a machine of the character mentioned, clamping means, hole boring means, dowel inserting means, and dowel sharpening or pointing means. With these and other objects in view the invention resides in the particular provision and operation of parts hereinafter fully described and illustrated in the accompanying drawings, in which:

Figure 3 is a transverse sectional view taken on the line 3—3, Figure 1.

Figure 4 is an end elevation.

Figure 5 is a horizontal longitudinal sectional view taken on the line 5—5, Figure 2.

Figure 1:
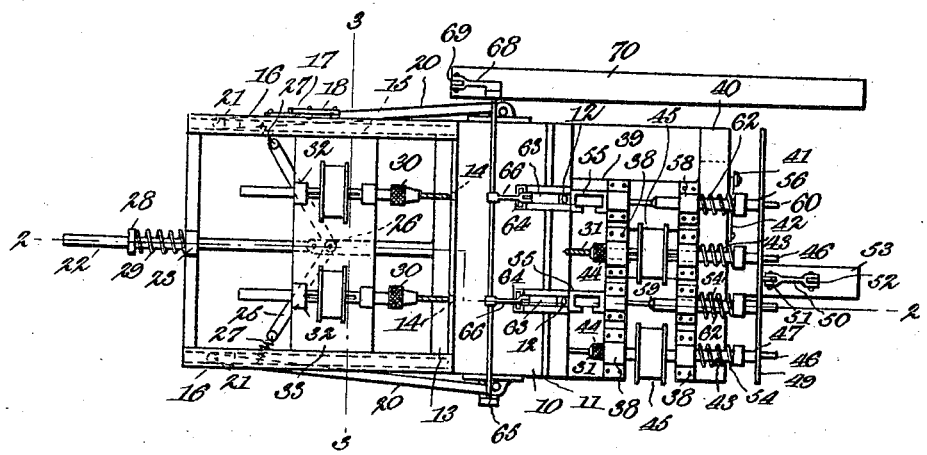
Figure 1 is a plan view.
Figure 2:
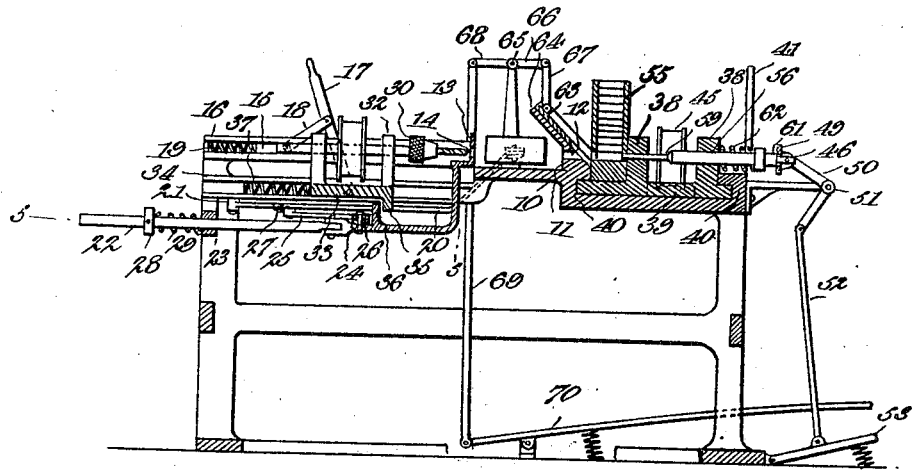
Figure 2 is a longitudinal sectional view taken on the line 2—2, Figure 1.

Referring now more particularly to the several views of the drawings for all of the details, it will be apparent that, the machine of the present invention will include a support or table 10 upon which the work is clamped in place for the doweling operations. The work operated upon may be any kind in which holes are bored, and in which holes, dowels are to be inserted, such as in the making of barrel heads. The material for making barrel heads is known as "heading" and the heading is clamped in place on the table for the boring and dowel inserting operations. The table 10 has an abutment 11 having a plurality of holes 12 therein for a purpose to appear.

In order to effect the clamping of the heading, there is provided a movable bar 13 having holes 14 therein. The bar 13 is carried by arms 15 which are movable in guides 16 on the frame of the machine. The bar 13 is movable over the top of the table 10. Movement of the bar 13 in one direction over the table 10 is effected by the employment of a hand lever 17 connected to a crank lever 18 having pin and slot connection with one of the arms 15. Return movement of the bar 13 to a normal position is effected by springs 19. The movement of the bar 13 over the table 10 against the side edge of heading on the table causes the heading to be clamped between the abutment 11 and the said bar. Clamping arms 20 are employed for preventing lateral movement of the heading. The arms 20 are pivotally mounted as at 21 to parts of the machine frame. Movements of the arms 20 is effected by the employment of a shaft 22 mounted for longitudinal movement in bearings 23 on the machine frame. The shaft 22 has attached thereto a member 24 to which are connected links 25, as at 26. The links 25 are connected respectively to the arms 20, and by virtue of springs 27, the links 25 are yieldingly connected to the said arms 20. A collar 28 is adjustable on the shaft 22, and a spring 29 is arranged between the collar 28 and one of the bearings 23. The member 24 is connected to the bar 13 so that the member 24 and the bar 13 move together. The springs 19 and the spring 29 allow extra movement of the shaft 22 after the arms 20 and the bar 13 are in clamping engagement with the heading, for a purpose to appear.

The boring or drilling of holes in the heading is accomplished by the use of drills 30 which put holes in one side edge of the heading; and drills 31 which put holes in the opposite side edge of the heading. The drills 30 are mounted for rotation in bearings 32 carried by a carriage 33 arranged for reciprocatory movement in guides 34 on the machine frame. The drills 30 may be rotated in any suitable manner. The carriage 33 has a lug 35 which is engaged at times by a lug 36 on the shaft 22 so that movement of the carriage 33 may be effected in the use of the same operating means which is used for effecting the movement of the bar 13. After the bar 13 and the arms 20 are in clamping engagement with the heading, the shaft 22, as hereinbefore stated, may have extra or additional movement, and as a consequence, the engagement of the lug 36 with the lug 35 may be brought about, with the result that the carriage 33 will be moved. This movement of the carriage will cause the extension of the drill-bits through the holes 14 in the bar 13 for the drilling of holes in the heading one and one-half inches long in spaced relation. Springs 37 connected to the carriage 33 and connected to the machine frame serve to return the carriage to a normal position. The drills 31 are mounted for rotation in bearings 38 on a carriage 39 arranged for reciprocation in guides 40 on the machine frame. Movement of the carriage 39 is effected by the use of any suitable means, and in the present instance use is made of a hand lever 41 pivotally mounted, and a crank lever 42 which has pin and slot connection with the said carriage. The drills 31 have sliding movement in the bearings 38. Each of the drills 31 embodies a shaft 43 by virtue of which they are slid and rotated. Stops 44 on each of the shafts 43 limit the movements thereof in opposite directions. Pulleys 45 are employed for the rotation of the drills 31, and each pulley is loosely keyed to its shaft so that the drills may be slid even though they are being rotated. Each of the shafts 43 has a reduced part 46 which provides a shoulder 47 on each shaft. The parts 46 of the shafts 43 extend through key-hole slots 48 in a bar 49 so that in certain positions of the shafts 43, portions of the bar 49 will work against the shoulders 47, whereas in certain other positions of the shafts 43 the bar 49 may move along the said shafts for a reason to appear. Movement of the bar 49 is effected by the use of a crank lever 50, pivotally mounted as at 51; a link 52; and a foot treadle 53 which is spring actuated. Springs 54 encircle the shafts 43 and effect the return movement thereof to normal positions with respect to the bearings 38.

It will now be manifest that, means is provided for boring holes in the opposite side edges of the work after it has been clamped in place, or holes may be bored in but one side edge of the work at the will of the operator.

In order that the pieces which constitute a barrel head may be brought securely in head forming relation, dowels are inserted in the holes in the intermediate pieces of heading for the attachment of the "cants"—"cant" being a term applied to the end pieces of a barrel head. The insertion of dowels is carried out by the employment of magazines 55 which are carried by the carriage 39 which hold supplies of dowels. Plungers 56 operate in conjunction with the magazines to eject the dowels singly from the magazines through the holes 12 in the abutment 11 after the carriage 39 has been moved to permit that. The plungers 56 are mounted for sliding movement in bearings 58 on the carriage 39. Each of the plungers 56 embodies a stop 59 which limits the longitudinal movement of each plunger in one direction. Each of the plungers has a reduced part 60 to provide a shoulder 61 which limits its longitudinal movement in one direction by the engagement of the shoulder with the bar 49. Certain of the key-hole slots 48 in the bar 49 receive the parts 60. In certain positions of the plungers 56 with respect to the bar 49, portions of the bar work against the shoulders 61, whereas in certain other positions of the plungers 56 with respect to the bar 49, the bar may move along the plungers. Springs 62 encircle the plungers 56, and they are employed to return the plungers to normal positions.

It will now be manifest that, by moving the carriage 39 to one position, the drills 31 may be made to drill holes and in the other position to which the carriage 39 may be moved, the plungers may be made to project dowels from the magazines, through the holes 12 into the holes made by the drills 31.

In order to facilitate the assembling of the pieces of heading into barrel head forming relation, the dowels are provided with points. In other words, the dowels are sharpened so that flagging which is put between joints can be put over the dowels without breaking the flagging. To this end knives 63 having reciprocatory movement are employed. The knives 63 move up and down in guide members 64. The said knives traverse the holes 12, and the cutting edges thereof are disposed normally above the said holes 12. A rock shaft 65 is mounted on the machine frame, and the said shaft has arms 66. Each of the arms 66 is connected to one of the knives 63 by a link 67. The shaft 65 has an arm 68 to which is connected a link or rod 69 which is connected to a spring actuated foot treadle 70. By working the foot treadle 70 the knives may be reciprocated for the cutting or sharpening operation.

To form a barrel head a piece of heading is placed on the table 10. The hand lever 17 is pulled with the result that the heading will be clamped between the abutment 11, bar 13 and the ends of clamping arms 20. Additional pull on the lever 17 causes the engagement of the lug 36 with the lug 35 with the result that the carriage 33 will be moved and the drills 30 carried thereby will drill a pair of holes in one side edge of the heading. The hand lever 41 is then manipulated to shift the carriage 39 to bring the drills 31 carried thereby into alinement with the holes 12. By pressing down on the foot treadle 53 the drills 31 will be moved longitudinally with the result that a pair of holes will be drilled in the opposite edge of the heading. The hand lever 41 is then manipulated to shift the carriage 39 to bring the plungers 56 in alinement with the holes 12. By pressing down on the foot treadle 53 the plungers 56 will be moved longitudinally with the result that a pair of dowels will be thrusted from the magazines into the holes drilled by the drills 31. Now, by pressing down on the foot treadle 70 the knives 63 will be moved downwardly in their guides 64, and will cut off portions of the dowels inserted in the last preceding operation, to "point" the dowels. The "cants" herein referred to have only a pair of holes drilled in them in the straight edges thereof, and the dowels are inserted in the manner explained in the pair of holes so drilled. These dowels are also "pointed" with the knives 63. The "pointed" dowels facilitate the assembling of the barrel head parts, and in cases where "flagging" or thin apertured strips are used in effecting the proper formation of the barrel head, the "pointed" ends of the dowels may be readily pushed through the apertures in the "flagging".

What is claimed is:

1. In a machine for inserting dowels in the dowel holes in barrel heading and for cutting and pointing the dowels after insertion thereof in said dowel holes, means for clamping the barrel heading in fixed position, means co-related to the clamping means for inserting dowels in said dowel holes of the barrel heading, and means also in co-relation to the clamping means for cutting and pointing the dowels after the insertion thereof in said dowel holes.

2. A doweling machine comprising mechanism for fixedly supporting a piece of material having dowel holes therein, mechanism for partly inserting dowels in the holes in said piece of material, and mechanism for cutting and pointing the inserted dowels at points at one side of said piece of material while the latter is supported.

3. A doweling machine comprising mechanism for fixedly supporting a piece of material, holing mechanism for drilling holes in said piece of material while it is fixedly supported, said holing mechanism including a plurality of shiftable drills, mechanism for partly inserting dowels in the holes in said piece of material while it is fixedly supported, and mechanism for cutting and pointing the inserted dowels at points at one side of said piece of material while the latter is supported.

4. A doweling machine comprising mechanism for fixedly supporting barrel heading, holing mechanism for drilling holes in said barrel heading while the latter is fixedly supported, said holing mechanism including sets of shiftable drills disposed to drill holes in the opposite sides of said barrel heading; mechanism for partly inserting dowels in certain of the holes drilled in said barrel heading while the latter is fixedly supported, and mechanism for cutting and pointing the inserted dowels at points at one side of said barrel heading while the latter is supported.

5. A doweling machine comprising mechanism for fixedly supporting barrel heading, holing mechanism for drilling holes in said barrel heading while the latter is fixedly supported, said holing mechanism including independently shiftable sets of drills disposed respectively to said barrel heading to drill holes in the opposite sides thereof; mechanism for partly inserting dowels in certain of said holes in said barrel heading while the latter is fixedly supported, and mechanism for pointing the protruding parts of the inserted dowels.

6. A doweling machine comprising supporting and clamping mechanism for fixedly supporting barrel heading, said supporting and clamping mechanism including pivotally mounted spring actuated gripping means, a yieldingly mounted bar and means for effecting the movements of said gripping means and said bar; holing mechanism for drilling holes in said barrel heading while the latter is fixedly supported, mechanism for partly inserting dowels in the holes drilled in said barrel heading while the latter is fixedly supported, and cutting mechanism for pointing the protruding parts of the inserted dowels.

7. A doweling machine comprising mechanism for fixedly supporting barrel heading, holing mechanism for drilling holes in said barrel heading while the latter is fixedly supported, mechanism for inserting dowels in the holes drilled in said barrel heading with parts of the dowels protruding from the holes, and cutting mechanism for pointing the protruding parts of said dowels inserted in the holes in said barrel heading while the latter is fixedly supported, the said cutting mechanism including knives of which each one moves to point one of said protuding parts, and means for effecting the movement of said knives.

8. A doweling machine, comprising mechanism for fixedly supporting barrel heading, holing mechanism for drilling holes in said barrel heading while the latter is fixedly supported, mechanism for inserting dowels in the holes drilled in said barrel heading with parts of the dowels protruding from the holes, and cutting mechanism for pointing the protruding parts of said dowels inserted in the holes in said barrel heading while the latter is fixedly supported, the said cutting mechanism including knives each having reciprocatory movement, guides in which each knife moves, and means for effecting the reciprocation of said knives.

9. A doweling machine comprising mechanism for fixedly supporting barrel heading, holing mechanism for drilling holes in said barrel heading while the latter is fixedly supported, dowel inserting mechanism for inserting a dowel in each hole in said barrel heading with a part of the dowel protruding while the barrel heading is fixedly supported, said dowel inserting mechanism comprising dowel magazines, plungers operable in conjunction with said magazines respectively to project dowels from the magazines, and means for effecting the reciprocation of said plungers; and cutting mechanism positioned with respect to the position of the barrel heading for pointing said protruding parts.

10. A doweling machine comprising mechanism for fixedly supporting barrel heading, holing mechanism for drilling holes in said barrel heading while the latter is fixedly supported, dowel inserting mechanism for inserting a dowel in each hole drilled in said barrel heading with a part protruding while the barrel heading is fixedly supported, said dowel inserting mechanism comprising shiftable dowel magazines, plungers operable in conjunction with said magazines respectively to project dowels from the magazines singly; and cutting mechanism positioned with respect to the position of the fixedly supported barrel heading for pointing said protruding parts of the inserted dowels.

11. A doweling machine comprising mechanism for fixedly supporting barrel heading, holing mechanism for drilling holes in said barrel heading while the latter is fixedly supported, said holing mechanism including a plurality of drills; dowel inserting mechanism for inserting a dowel in each hole drilled in said barrel heading with a part of each dowel protruding from its hole, said dowel inserting mechanism including dowel projecting plungers; means for effecting the reciprocation of said drills, the said means serving to effect the reciprocation of said plungers, and cutting mechanism positioned with respect to the position of said barrel heading for pointing the protruding parts of the inserted dowels.

12. A doweling machine comprising clamping and supporting mechanism for fixedly supporting barrel heading, said clamping and supporting mechanism including clamping members; holing mechanism for drilling holes in said barrel heading while the latter is fixedly supported, said holing mechanism including drills; means for actuating said clamping members and for effecting the reciprocation of said drills, dowel inserting mechanism for partly inserting a dowel in each of the holes drilled in said barrel heading while the latter is fixedly supported in its original position, and cutting mechanism for pointing the protruding part of each of the inserted dowels, said cutting mechanism including knives each of which is operable to cut diagonally across the protruding part of one of said inserted dowels in the pointing operation.

13. A doweling machine comprising hole making mechanism, supporting and clamping mechanism, dowel positioning and inserting mechanism, knives having reciprocatory movement, guides in which the knives move at an angle with respect to the inserted positions of the dowels and means for effecting the reciprocation of said knives.

14. In a machine, a work supporting table, means for clamping the work in place on said table, a carriage mounted for reciprocatory movement, a drill carried by said carriage, a magazine carried by said carriage, a plunger carried by said carriage and operable in conjunction with said magazine to eject dowels therefrom, means for effecting the reciprocation of said carriage, and means for effecting the rotation of said drill, and means for effecting the reciprocation of said drill and the reciprocation of said plunger selectively.

15. In a machine, a work supporting table, means for clamping the work in place on said table, a carriage mounted for reciprocatory movement, drills carried by said carriage, magazines carried by said carriage, plungers carried by said carriage and operable in conjunction with said magazines to eject dowels therefrom, means for effecting the reciprocation of said carriage, means for effecting the rotation of said drills, means for effecting the reciprocation of said drills and the reciprocation of said plungers selectively.

16. In a machine, a work supporting table, an abutment on said table, the said abutment having apertures therein, means for clamping work in place on said table against said abutment, a carriage mounted for reciprocatory movement, drills carried by said carriage, the said drills being operable through said abutment by virtue of said apertures, magazines carried by said carriage, plungers carried by said carriage and operable in conjunction with said magazine to eject dowels therefrom, means for effecting the reciprocation of said carriage, means for effecting the rotation of said drills, and means for effecting the reciprocation of said drills and the reciprocation of said plungers selectively.

17. A machine having a work supporting table, an apertured abutment on said table, means for clamping work in place on said table against said abutment, a carriage mounted for reciprocatory movement, means for limiting the movement of the carriage in opposite directions, drills carried by said carriage, the said drills being operable through said abutment by virtue of the apertures in the abutment, magazines carried by said carriages, plungers carried by said carriage operable in conjunction with said magazines to eject dowels therefrom through the apertures in the abutment a predetermined distance, means for effecting the reciprocation of said carriage, means for effecting the rotation of said drills, means for effecting the reciprocation of said drills and the reciprocation of said plungers selectively, and means allowing the drills to be reciprocated while they are being rotated.

In testimony whereof I hereby affix my signature.

JOHN LITTLEFIELD.